United States Patent [19]

Anstey

[11] 4,047,587
[45] Sept. 13, 1977

[54] TRACTOR-IMPLEMENT CONTROL SYSTEM

[75] Inventor: Henry Dennis Anstey, Ottumwa, Iowa

[73] Assignee: Deere & Company, Moline, Ill.

[21] Appl. No.: 704,287

[22] Filed: July 12, 1976

[51] Int. Cl.² .................. B60K 25/00; F16K 31/46
[52] U.S. Cl. .................. 180/53 R; 180/77 R;
251/230; 251/294; 280/421
[58] Field of Search .......... 180/14 R, 14 B, 77 R,
180/53 R; 251/294, 230; 280/421

[56] References Cited

U.S. PATENT DOCUMENTS

| | | | |
|---|---|---|---|
| 1,814,907 | 7/1931 | Dugan | 251/230 X |
| 2,457,478 | 12/1948 | Letvin | 280/421 |
| 3,329,225 | 7/1967 | Dunn | 280/421 X |
| 3,985,394 | 10/1976 | Rolfes | 180/77 R X |

*Primary Examiner*—Richard A. Bertsch
*Assistant Examiner*—Terrance L. Siemens

[57] ABSTRACT

A mobile agricultural machine pulled by a tractor has first and second hydraulically actuated functional units powered through a single pair of outlets of a hydraulic system on the tractor. A spool-type direction control valve mounted on the machine has its inlet side connected to the outlets of the tractor hydraulic system and outlets connected to the respective hydraulic actuators. The valve spool is selectively positioned by means of a cam to direct oil to actuate either the first or second functional units. The cam is rotated by a bell crank through a sprag clutch so that the cam is driven in one direction only. The throw of the bell crank is limited by a stop and it is provided with a spring return so that an operator on the tractor may, by successive pulls on a single control rope attached to the bell crank, progressively index the cam and hence selectively actuate either the first or second functional units on the machine.

8 Claims, 5 Drawing Figures

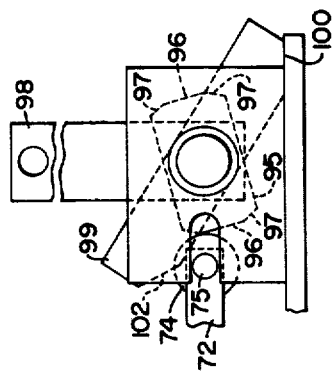
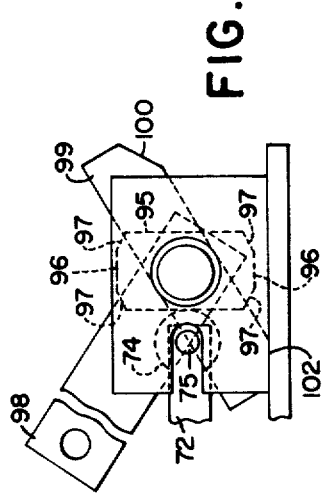
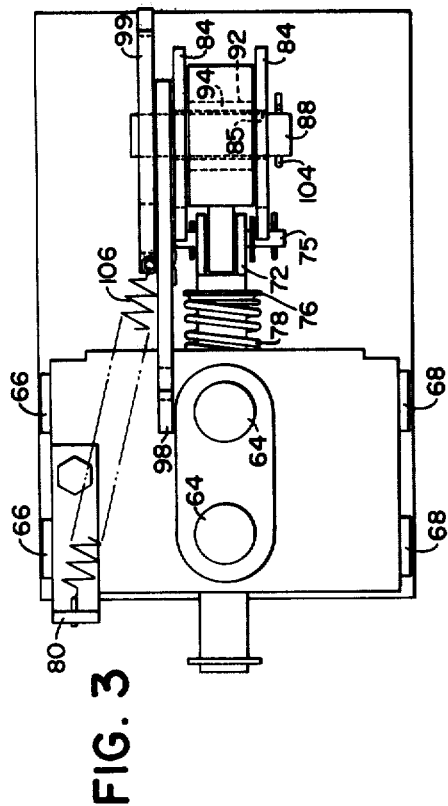
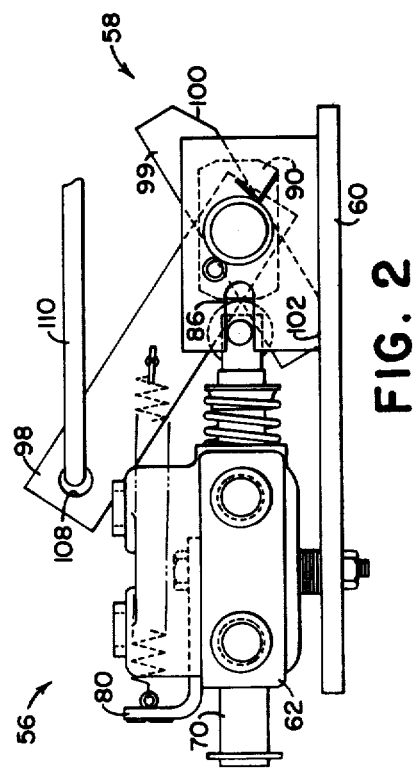

TRACTOR-IMPLEMENT CONTROL SYSTEM

BACKGROUND OF THE INVENTION

This invention relates to a tractor-implement control system and more particularly, to a control for hydraulic actuators on trailing agricultural implements so that oil flow from a single hydraulic outlet means of a hydraulic power source on a tractor may be selectively directed to power more than one hydraulic function on the implement.

The hydraulic systems of many agricultural tractors include only one outlet means through which hydraulic power controlled by a selective control valve on the tractor can be provided to power hydraulic actuators such as hydraulic cylinders on drawn machines. However, it is becoming increasingly common for drawn agricultural machines to be equipped with two or more hydraulically powered functions requiring separate operation and control. Many of these hydraulic functions are used only intermittently and frequently there is no requirement for simultaneous operation.

In the past the most practical way to provide for the operation of two or more hydraulic functions on a drawn machine has been to equip the tractor with additional selective control valve outlet means. However, for the many farm operations where the multiple hydraulic function is required only for one or two machines and only for occasional and intermittent use, such a solution is too costly.

SUMMARY OF THE INVENTION

Accordingly, it is an object of the present invention to provide a simple, low cost, easy to operate valve arrangement permitting two hydraulic functions on a drawn machine to be operated and controlled from a tractor having a single selective control valve outlet means.

It is a feature of the invention that it is readily adaptable to any combination of tractor and drawn implement having the above specifications. A valve and a mechanical actuator are combined in an assembly which may be mounted permanently or temporarily, for example, on the tongue of the drawn machine, with conventional hose connections being made to the hydraulic outlet means on the tractor and the hydraulic units on the machine. The control connection between the tractor and valve actuator is a simple rope. Successive pulls on the control rope progressively index a cam, conditioning the valve to direct hydraulic fluid to a selected function on the machine.

It is a feature of the invention that the valve actuator is simple and robust. Operation of the control does not require careful attention or prescision by the operator. The operator need only pull the control rope to a stop in the actuator mechanism, partially indexing the cam to an over-center condition. Completion of the cam indexing and setting of the valve is completed automatically by spring means in the valve. Because the mechanical actuator parts are not relied upon for precise setting of the valve, they need not be manufactured to close dimensional tolerances and so cost is reduced.

BRIEF DESCRIPTION OF THE DRAWINGS

FIG. 2 is a side elevation of the implement valve and mechanical actuator showing the spool in the "in" position.

FIG. 3 is a top view of the valve and actuator assembly.

FIG. 4. is a partial side elevation of the mechanical actuator with the control rope released and the cam indexed so that the spool is in the "out" position.

FIG. 5 is also a partial side elevation showing the position of the mechanical actuator parts with the control rope pulled and the cam in an intermediate over-center position approaching the "spool in" condition of the valve.

DESCRIPTION OF THE PREFERRED EMBODIMENT

Figure 1:
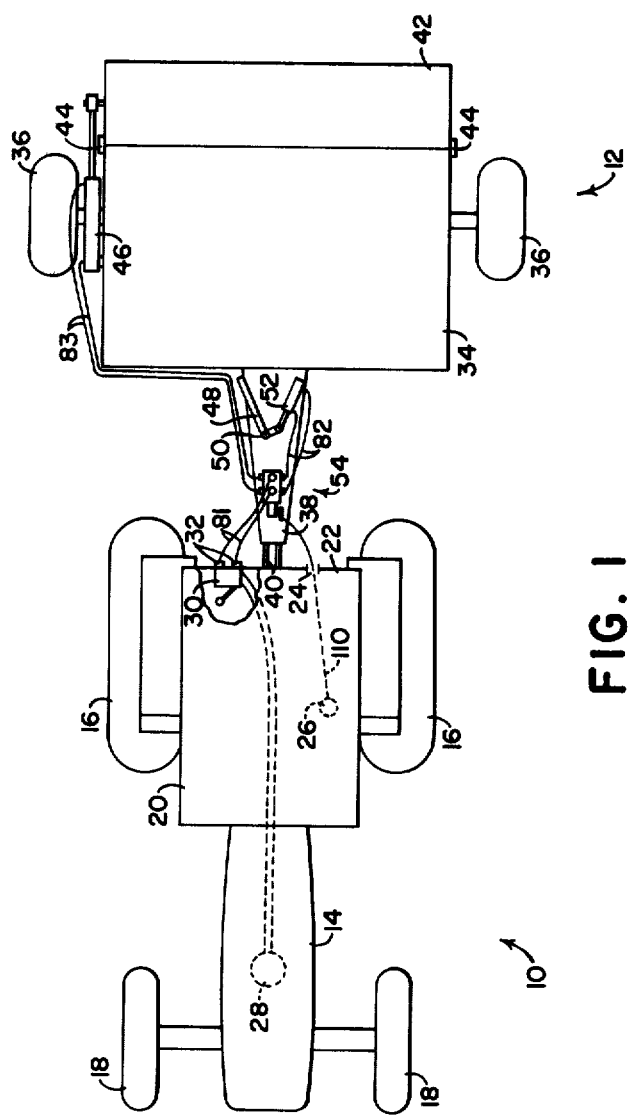
FIG. 1 is a diagrammatic top view of a tractor-implement combination embodying the invention.

The invention is embodied in a tractor implement combination that is diagrammatically illustrated in FIG. 1 wherein the numeral 10 indicates a tractor in general and the numeral 12 indicates the implement. The figure represents a generalized pull-type implement somewhat similar to a large round baler.

The tractor includes a fore-and-aft body 14 mounted on a pair of rear drive wheels 16 and steerable front wheels 18, the vehicle operator station being enclosed within a cab 20 disposed between the two rear wheels. As is well known an operator's seat and the tractor controls are all mounted in the cab. The cab has an upright rear wall 22 which includes an opening 24. Inside the cab adjacent the operator's seat is a support structure or bracket 26. As is conventional the tractor includes a hydraulic pump and reservoir 28 and a manually actuated control valve 30 for controlling the hydraulic fluid flow through a pair of conventional hydraulic coupling elements 32 on the rear of the tractor.

The geheralized implement 12 includes a mobile frame 34 supported on a pair of wheels 36, the frame having a forwardly extending draft member or tongue 38 releasably connectible to a conventional drawbar 40.

The implement includes a rear gate 42 pivoted to the main frame 34 by a pair of hinges 44, the opening and closing of the gate being controlled by a hydraulic cylinder 46. A second hydraulically actuated component, a twine dispensing arm 48, is mounted on the tongue 38 and is swingable in a generally horizontal plane about pivot 50 and actuated by a second hydraulic cylinder 52. Such hydraulically actuated functions are typical of drawn implements and are only exemplary. The twine dispensing and gate control functions, for example, are found in large round balers. Such balers are well known and their general construction and operation including the two hydraulically actuated functions mentioned are described in detail in U.S. Pat. Nos. 3,894,484, 3,913,473 and 3,931,702, also assigned to the assignee herein. In such balers crop material is picked up from the ground and fed into a baling zone between upper and lower bale-forming endless belt conveyors and formed into a large cylindrical bale. When the bale is fully formed, it is wrapped with twine as it continues to rotate between the conveyors. During this process the twine dispenser arm similar to the arm 48 is actuated by a hydraulic cylinder such as hydraulic cylinder 52 to swing across the front of the bale so that twine is distributed from one side of the bale to the other. After the bale is wrapped with twine, a rear gate such as gate 42 is raised, actuated by a hydraulic cylinder such as cylinder 46 and the bale is ejected rearwards onto the ground.

Mounted on the implement tongue 38 is an implement valve and actuator assembly indicated generally by the numeral 54 in FIG. 1 and shown best in FIGS. 2 and 3. The assembly includes an implement valve indicated generally by the numeral 56 and an actuator indicated generally by the numeral 58, both attached rigidly to a frame 60, the actuator being mounted on the forward end of the frame towards the tractor. The valve 56 is of the conventional direction control spool-type and such valves are well known. The valve includes a body 62 having a pair of upwardly directed inlet ports 64 in the upper central part of the body and opposite pairs of outwardly directed outlet ports 66 and 68 on the left-hand and right-hand sides os the valve body respectively. The lower central part of the body 62 houses a longitudinally and horizontally disposed conventional valve spool 70 closely fitting the housing for sliding motion in a fore-and-aft direction. A forward extending portion of the spool comprises a cam-follower portion 72 including a freely turning roller 74 journaled on a guide pin 75 which extends horizontally and transversely from the spool. Towards the cam-follower portion 72 the spool 70 carries a rigidly attached annular collar 76. A conventional compression spring 78 is threaded onto the spool to the rear of the collar 76 and is contained between the collar and valve body 62. A spring bracket 80 is rigidly attached to the top of the valve body towards its left-hand side.

The internal design of the valve 56 is conventional and is arranged so that when the spool 70 is in the rearward or "in" position as shown in FIGS. 2 and 3, the inlet ports 64 are connected directly and in parallel with the outlet ports 68 on the right-hand side of the valve. Similarly when the spool 70 is in a forward or "out" position as indicated in FIG. 4, the inlet ports 64 are in direct and parallel communication with the outlet ports 66 on the left-hand side of the valve body. Three pairs of conventional hydraulic hoses 81, 82 and 83 are connected between the tractor coupling elements 32 and the valve inlet ports 64, the valve outlet ports 66 and the twine dispenser cylinder 52, and valve outlet ports 68 and gate cylinder 46 respectively.

The actuator 58 is mounted on the frame 60 directly ahead of the valve 56 and longitudinally aligned with the spool 70. The actuator includes a pair of opposite upright bearing brackets 84 having a pair of horizontally and transversely aligned bores 85 and rearward of the bores, a pair of opposite open-ended slots 86, the center lines of the bores and the slots being in the same horizontal plane as the longitudinal center line of the spool 70. The bearing brackets 84 are located so that the slots 86 engage the guide pin 75 throughout the range of travel of the spool 70. A drive pin or spindle 88 is carried in the bores 85 and extends transversely on both sides of the bearing brackets 84. Journaled on the pin 88 between the brackets 84 is a cam 90 engaging the cam-follower roller 74 and having a bore 92 spaced concentrically from the pin 88 by a conventional bearing and sprag clutch assembly 94. The cam 90 is generally rectangular and symmetrical about its bore 92, having a pair of opposite long flate faces 95 and a pair of opposite short flat faces 96, each corner connecting the flat faces having a short rounded face 97.

Attached rigidly to the drive pin 88 immediately adjacent and outside of the left-hand bearing bracket 84 are a driving member or bell crank 98 and closely adjacent to the bell crank 98, a stop bar 99, both members extending generally perpendicularly to the axis of the pin 88.

The stop bar 99 is generally rectangular but has forward and rear lower diagonally trimmed edges 100 and 102 respectively. A conventional cotter pin 104 retains the drive pin 88 and attached bell crank 98 and stop bar 99 in the bearing brackets 84. A conventional tension spring 106 attached at its forward end towards the midpoint of the bell crank 98 and at its rearward end to the spring bracket 80 extends generally horizontally and biases the bell crank 98 rearwardly towards its normal or initial position with the edge 102 of the stop bar 99 engaging the frame 60. Towards the outer end of the bell crank 98 a hole 108 is provided for attachment of a pull rope 110 which entends forward, passing through the opening 24 in the rear wall 22 of the cab having its forward end attached to bracket 26 in the cab adjacent the operator (the rope 110 is omitted from FIG. 3 for clarity).

In operation, the operator on the tractor may at appropriate times in the operation of the implement in the field, selectively direct hydraulic power from the tractor to the hydraulic cylinders 52 and 46 actuating the twine dispenser arm 48 and the rear gate 42 respectively, by making successively pulls on the rope 110 to set the implement valve 56 and mainpulating the control valve 32 at the operator's station as required. The sprag clutch 94 is oriented so that, when the bell crank 98 is pulled forward by the rope 110 and the drive pin 88 thus rotated in a clockwise direction as viewed in FIG. 2, the clutch engages and there is a direct drive between the pin 88 and the cam 90 so that the cam is indexed clockwise. When the rope is released the spring 106 biases the bell crank 98 rearward and, the direction of rotation of the drive pin 88 being thus reversed, the spray clutch 94 is disengaged so that the pin turns freely without affecting the position of the cam. It will be realized that sufficient length of rope 110 must be provided so that the bell crank 98 may be returned to its initial or normal position as indicated in FIG. 2 with the rearward edge 102 of the stop bar 99 in contact with the frame 60.

It will also be realized that because a generally rectangular symmetrical cam is used, it is necessary to index the cam approximately 90° to move between the spool in and spool out positions as indicated in FIGS. 2 and 4 respectively, but it will be noted, however, that the maximum possible throw or forward rotation of the bell crank 98 permitted by the stop bar 99 is less than 90° as seen in a comparison of the relative positions of the bell crank 98 in FIGS. 2 and 5. However, a normal pull on the rope approximating a full throw (preferably about 60°) of the bell crank 98 is sufficient to index the cam to an overcenter condition as indicated in FIG. 5 when the effect of the spool compression spring 78 urging the spool and cam roller 74 outwards is to turn the cam in a clockwise direction, completing the required 90° indexing, because the short flat face of the cam 96 is so inclined to the direction of the force of the compression spring 78, applied to the cam face through the roller 74, and because the cam 90 is free to rotate in a clockwise direction, overrunning the sprag clutch 94. FIG. 5 illustrates the actuator on the point of completing indexing to change the valve from the spool out to the spool in setting in which the short face of the cam 96 engages the cam roller 74. The over-center action of the mechanism to complete indexing when moving from the spool in setting to the spool out setting when the long face 95 of the cam engages the cam roller 74 is similar, but is not shown in the drawings.

I claim:

1. In a tractor-trailing implement combination wherein the tractor includes an operator's station, a hydraulic coupling means connected to a hydraulic power source on the tractor, and a control valve for controlling the flow of hydraulic fluid between the source and the coupling means, and the implement includes a frame and at least two functional units with hydraulic actuators, an improved hydraulic control system for connecting the hydraulic actuators on the implement to the coupling means on the tractor and directing the flow of hydraulic fluid between them comprising:

an implement valve mounted on the implement frame having an inlet connected to the coupling means, at least two outlets respectively connected to the hydraulic actuators, and a control element movable to a plurality of settings so that the inlet may be selectively connected to any one of the outlets and biased to a first setting; and means operatively connected to the control element for moving the control element between its alternate settings and including locking means for retaining the control element in any one of the selected settings and actuating means disposed at the operator's station and connected to the locking means so that an operator on the tractor may selectively direct hydraulic power to any one of the hydraulic actuators on the implement.

2. The invention defined in claim 1 wherein the control element of the implement valve includes a cam-follower portion and the means for moving the control element includes a cam movably mounted on the implement frame, the cam engaging the cam-follower portion so that movement of the cam causes movement of the control element.

3. The invention defined in claim 2 wherein the control element is a spool and the cam movement is one of rotation about an axis perpendicular to the longitudinal axis of the spool and the means for moving the spool further includes drive means engaging the cam for rotating it in one direction only, including a driving member having an initial position and a stop limiting the throw of the driving member from said initial position and hence limiting rotation of the cam for any given engagement of the drive means, and means for returning the driving member to the initial position so that the cam may be progressively indexed to shift the spool consecutively and repetitively to each of said settings, and the actuating means includes a flexible member operatively connected to the driving member and manipulatable by the operator to actuate said drive means.

4. The invention defined in claim 3 wherein the cam has an open face and a spring carried by the implement valve biases the cam-follower portion of the spool towards the cam so as to maintain the cam-follower in engagement with the cam face.

5. The invention defined in claim 4 wherein the limited throw of the driving member carries the indexing of the cam to an over-center condition and indexing is completed by the spring force acting on the cam through the cam follower portion of the spool.

6. The invention defined in claim 3 wherein the drive means further includes a spindle fournaled in the frame and operatively connected to the driving member, and an annular sprag clutch assembly carried on said spindle and wherein the cam has a cylindrical bore compatible with said clutch and is journaled on said clutch and spindle in said one-direction driving relationship.

7. The invention defined in claim 6 wherein the driving member comprises a bell crank having an inner end attached rigidly to said spindle and an outer end.

8. The invention defined in claim 7 wherein the drive means further includes a spring biasing the bell crank towards said initial position and wherein the flexible member is a control rope connected to the outer end of the bell crank.

* * * * *